United States Patent
Johnson (10) Patent No.: US 8,140,598 B2
(45) Date of Patent: Mar. 20, 2012

(54) CREATING REFERENCES IN A SCOPED MEMORY SYSTEM

(75) Inventor: Andrew Johnson, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 546 days.

(21) Appl. No.: 12/095,246

(22) PCT Filed: Apr. 24, 2007

(86) PCT No.: PCT/EP2007/054004
§ 371 (c)(1),
(2), (4) Date: May 28, 2008

(87) PCT Pub. No.: WO2007/128687
PCT Pub. Date: Nov. 15, 2007

(65) Prior Publication Data
US 2008/0294685 A1    Nov. 27, 2008

(30) Foreign Application Priority Data

Apr. 28, 2006  (GB) .................................. 0608406.5

(51) Int. Cl.
*G06F 12/00*   (2006.01)
*G06F 17/30*   (2006.01)

(52) U.S. Cl. ................. 707/813; 707/E17.011; 711/170

(58) Field of Classification Search .................. 707/813, 707/999.206, E17.011; 711/170
See application file for complete search history.

(56) References Cited

U.S. PATENT DOCUMENTS 7,496,897 B1 * 2/2009 Dibble et al. ................. 717/127
7,979,659 B2 * 7/2011 Obata et al. ................... 711/165
2003/0097537 A1 * 5/2003 Bollella et al. ................ 711/170

OTHER PUBLICATIONS

Pizlo et al, "Real-Time Java Scoped Memory: Design Patterns and Semantics", 2004.*
Higuera-Toledano, "Studying the Behaviour of the Single Parent Rule in Real-Time Java", 2004.*
Deters et al, "Automated Discover of Scoped Memory Regions for Real-Time Java", 2002.*
Eric Bruno, "Go Inside the Java Real-Time System", 2010, available online: http://www.devx.com/JavaArticle/33475/1954.*

(Continued)

*Primary Examiner* — Mohammad Ali
*Assistant Examiner* — Brannon W Smith
(74) *Attorney, Agent, or Firm* — Yee & Associates, P.C.; David A. Mims, Jr.

(57) ABSTRACT

A method for creating a reference in a scoped memory system, the scoped memory system including a scope graph of scoped memory areas, wherein each scoped memory area is suitable for the allocation of objects therein for access by software threads and has associated a thread count for indicating that the scoped memory area is discardable, the method comprising the steps of: allocating a target object in a target scoped memory area; storing an index associated with the target object of a depth of the target scoped memory area in the scope graph; allocating a source object in a source scoped memory area; storing an index associated with the source object of a depth of the source scoped memory area in the scope graph; in response to a determination that the source scoped memory area is at the same depth as or deeper than the target scoped memory area by comparing the index associated with the source object and the index associated with the target object, creating a reference from the target object to the source object.

6 Claims, 6 Drawing Sheets

OTHER PUBLICATIONS

M. Teresa Higuera-Toledano, "Studying the Behaviour of the Single Parent Rule in Real-Time Java", 2004.*
Proceedings of the 2003 ACM SIGPLAN Conference on Language, San Diego, CA, pp. 1-4, vol. 38, Issue 7 Jul. 2003.
Toledano, "The Indeterministic Behavior of Scoped Memory in Real-Time Java", 2006 IEEE, pp. 656-663.
Corsaro et al., "Efficient Memory-Reference Checks for Real-Time Java", LCTES'03, Jun. 11-13, 2003, San Diego, California. 2003 ACM, pp. 1-8.

* cited by examiner

CREATING REFERENCES IN A SCOPED MEMORY SYSTEM

FIELD OF THE INVENTION

The present invention relates to the creation of a reference in a scoped memory system. More particularly it relates to reducing processing overhead during the creation of a reference.

BACKGROUND OF THE INVENTION

Scoped memory areas are areas of memory suitable for the allocation and deallocation of objects without some of the disadvantages of garbage collected heaps. A software thread can enter a scoped memory area and all object allocations by the thread will then be made within the scoped memory area. The thread can also enter multiple scoped memory areas in a nested fashion. For example, the thread can enter a second scoped memory area which becomes the default allocation area. Scoped memory areas are organised in a scope graph with each scoped memory area having a parent being the previously entered scoped memory area. A first scoped memory area has a primordial scoped memory area as its parent.

A thread count is maintained for each scoped memory area of a number of active threads in the area. The thread count coupled with the scope graph indicates when a scoped memory area, including any objects allocated in the scoped memory area, is discardable. For example a scoped memory area may be discardable when an associated thread count is decremented from one to zero and the scoped memory area is not a parent for any other scoped memory area. In this way, scoped memory areas offer alternative allocation spaces for objects in an otherwise garbage collected object oriented environment, such as Java (Java is a registered Trademark of Sun Microsystems). The use of such scoped memory areas can address the problem of delays in application execution caused by garbage collection algorithms since all objects in scoped memory areas become discardable at the same time defined in terms of thread usage of the memory area and the organisation of a scope graph.

A first object in a first scoped memory area can reference a second object in a second scoped memory area. However, since individual scoped memory areas can become completely discardable it is necessary to enforce strict rules regarding valid and invalid references between objects in different scoped memory areas. These rules are necessary to guarantee that a parent scoped memory area has a lifetime that is at least that of its child scoped memory areas so that objects in descendant memory areas can reliably reference objects in ancestor memory areas. In this way, dangling references can be avoided. This is described in "Efficient Memory-Reference Checks for Real-time Java" (Corsaro and Cytron, ACM SIGPLAN Volume 38, Issue 7 Jul. 2003).

One such rule is that a scoped memory area has at most one parent. This is known as the "single parent rule". The single parent rule provides that the order of entry into scoped memory areas by different threads is always the same because the order of entry of threads into scoped memory areas defines the structure of the scoped memory areas in the scope graph. Further, a source object allocated in a source scoped memory area can only reference target objects in the same or ancestral scoped memory areas. An ancestral scoped memory area is a memory area which is entered by a thread before the source scoped memory area. The source scoped memory area is said to have inner scope with respect to that of the target object. This criterion ensures that the source object will always be de-allocated before the target object. Attempts to create references which do not satisfy the criterion must fail according to the Real-Time Specification for Java (Bollella et al, Addison-Wesley, 2000). Thus the criterion must be checked in an efficient manner whenever a new reference to a target object is created.

One way to determine whether this criterion is satisfied for the creation of a reference between objects is to iterate through scoped memory areas in a scope graph. Iteration starts at the source scoped memory area and progresses through each parent scoped memory area checking for the target scoped memory area. If the target scoped memory area is encountered within the scope graph during the iterations then it can be concluded that the criterion is satisfied because the target area is an ancestor of the source area. If the iterations reach the primordial scoped memory area (the "root" of the scope graph) then it can be concluded that the criterion is not satisfied because the target scoped memory area is not an ancestor of the source scoped memory area.

An alternative approach is to determine an index of the distance between the scoped memory area of the target object and the primordial scoped memory area. This distance can be considered to be a "depth" of the target scoped memory area. Additionally, an index of the distance between the scoped memory area of the source object and the primordial scoped memory area can be determined as a "depth" of the source scope. The term depth here is used to indicate that scoped memory areas exist at levels which are some distance from the primordial scoped memory area. Deeper scoped memory areas are located at a level in the scope graph which is further from the primordial scoped memory area. A comparison of these indices of depth will determine whether the target scoped memory area is an ancestor of the source scoped memory area because descendent areas will always be deeper (further from the primordial scoped memory area) than ancestor areas. Thus, if the source scoped memory area is deeper than the target scoped memory area then the criterion is satisfied and a reference can be created.

While these approaches may be effective in applying the criterion for the creation of new references, they involve time consuming iterations through a scope graph at the point of reference creation. These iterations are required either to scan the entire scope graph for the target scoped memory area, or to determine the depth indices.

Thus it would be advantageous to determine whether the rule that a source object allocated in a source scoped memory area can only reference target objects in ancestral scoped memory areas is satisfied without requiring undesirably high processing overhead due to iterations through a scope graph.

SUMMARY OF THE INVENTION

The present invention accordingly provides, in a first aspect, a method for creating a reference in a scoped memory system, the scoped memory system including a scope graph of scoped memory areas, wherein each scoped memory area is suitable for the allocation of objects therein for access by software threads and has associated a thread count for indicating that the scoped memory area is discardable, the method comprising the steps of: allocating a target object in a target scoped memory area; storing an index associated with the target object of a depth of the target scoped memory area in the scope graph; allocating a source object in a source scoped memory area; storing an index associated with the source object of a depth of the source scoped memory area in the scope graph; in response to a determination that the source scoped memory area is at the same depth as or deeper than the target scoped memory area by comparing the index associated with the source object and the index associated with the target object, creating a reference from the target object to the source object.

Thus the storage of an index of the depth of a scoped memory area associated with an object allocated in the scoped memory area at the time of creation of the object, it is not necessary to undertake to determine the depth of the scoped memory area at the time of creation of a reference. In this way the arduous iterations of the prior art in checking for satisfaction of the criteria for scoped memory systems when creating a reference between scoped memory areas are avoided. In this way processing overhead during the creation of a reference is reduced.

Preferably the step of creating a reference from the target object to the source object is further responsive to a determination that the target scoped memory area and the source scoped memory area lie in a common branch of the scope graph.

The present invention accordingly provides, in a second aspect, an apparatus for creating a reference in a scoped memory system, the scoped memory system including a scope graph of scoped memory areas, wherein each scoped memory area is suitable for the allocation of objects therein for access by software threads and has associated a thread count for indicating that the scoped memory area is discardable, the apparatus comprising: means for allocating a target object in a target scoped memory area; means for storing an index associated with the target object of a depth of the target scoped memory area in the scope graph; means for allocating a source object in a source scoped memory area; means for storing an index associated with the source object of a depth of the source scoped memory area in the scope graph; means for, in response to a determination that the source scoped memory area is at the same depth as or deeper than the target scoped memory area by means for comparing the index associated with the source object and the index associated with the target object, creating a reference from the target object to the source object.

The present invention accordingly provides, in a third aspect, an apparatus comprising: a central processing unit; a memory subsystem; an input/output subsystem; and a bus subsystem interconnecting the central processing unit, the memory subsystem, the input/output subsystem; and the apparatus as described above.

The present invention accordingly provides, in a fourth aspect, a computer program element comprising computer program code to, when loaded into a computer system and executed thereon, cause the computer to perform the steps of the method described above.

BRIEF DESCRIPTION OF THE DRAWINGS

A preferred embodiment of the present invention will now be described, by way of example only, with reference to the accompanying drawings, in which.

DETAILED DESCRIPTION OF THE PREFERRED EMBODIMENT

Figure 1:
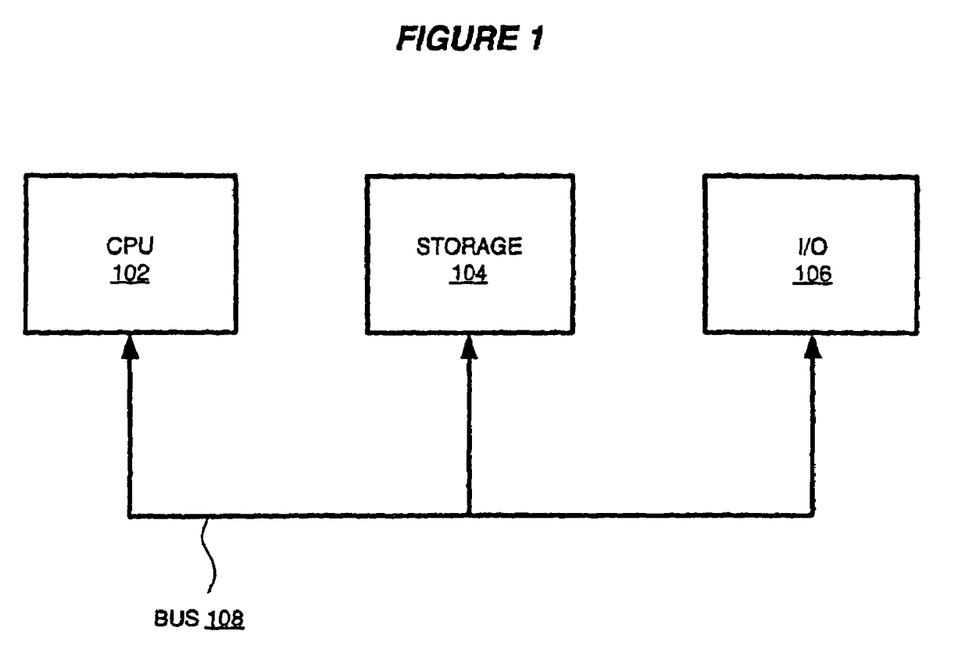
FIG. 1 is a block diagram of a computer system suitable for the operation of embodiments of the present invention.

FIG. 1 is a block diagram of a computer system suitable for the operation of embodiments of the present invention. A central processor unit (CPU) 102 is communicatively connected to a storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
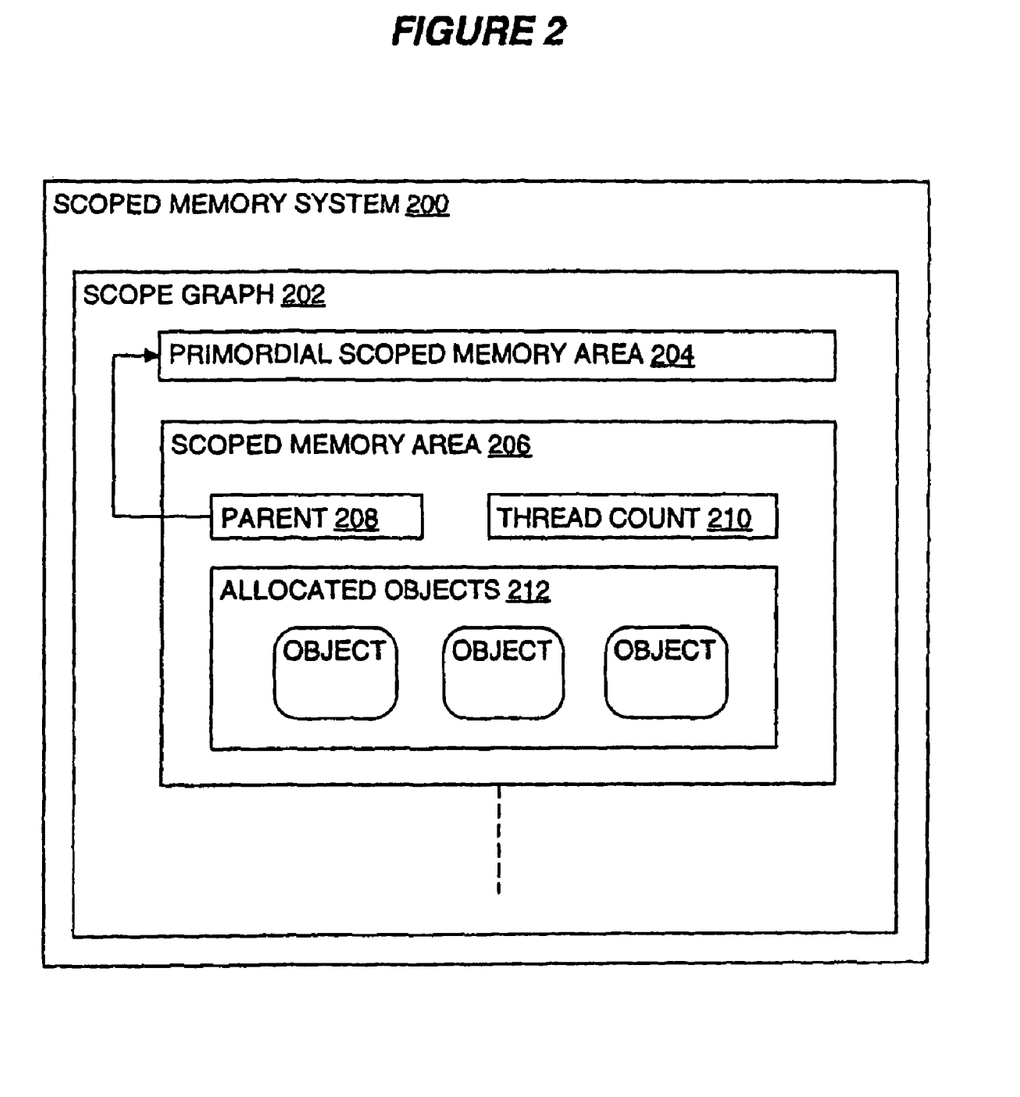
FIG. 2 is a block diagram of an exemplary scoped memory system in accordance with a preferred embodiment of the present invention.

FIG. 2 is a block diagram of an exemplary scoped memory system 200 in accordance with a preferred embodiment of the present invention. The scoped memory system is an arrangement of a part of a storage 104 of a computer system such as the scoped memory system described in the Real-Time Specification for Java (Bollella et al, Addison-Wesley, 2000). In use, the scoped memory system 200 includes a scope graph 202 which is a data structure arrangement of zero or more scoped memory areas such as scoped memory area 206. Scope graph 202 is commonly referred to in the art as a "scope stack" although the data structure of scope graph 202 is not necessarily a stack data structure. The scope graph 202 can be implemented as a directed graph data structure, a stack data structure, a tree data structure, a linked list or any data structure suitable for the storage of zero or more scoped memory areas.

Scoped memory area 206 is a defined area of memory in storage 104 suitable for the allocation and reference of software objects (hereinafter referred to as objects). Objects can be allocated and accessed in an allocated objects 212 part of the scoped memory area by software threads which execute in the context of the scoped memory area 206. The scoped memory area 206 further includes a thread count 210 as a count of a number of software threads executing in the context of the scoped memory area 206. A thread executes in the context of the scoped memory area 206 by explicitly entering the scoped memory area, such as by calling of an application programming interface function. Once a thread has entered the scoped memory area 206, allocations of objects will be undertaken within the scoped memory area 206 unless specifically allocated elsewhere by the thread, such as in the general heap or another scoped memory area.

Scoped memory area 206 further includes a parent field 208 which includes a reference to a parent scoped memory area. As described above, a scoped memory area has at most one parent. An arrangement of scoped memory areas defined by way of a parental relationships therebetween defines the scope graph 202. An initial scoped memory area having no particular parent will refer to a primordial scoped memory area 204 as its parent by way of a placeholder.

Figure 3A:
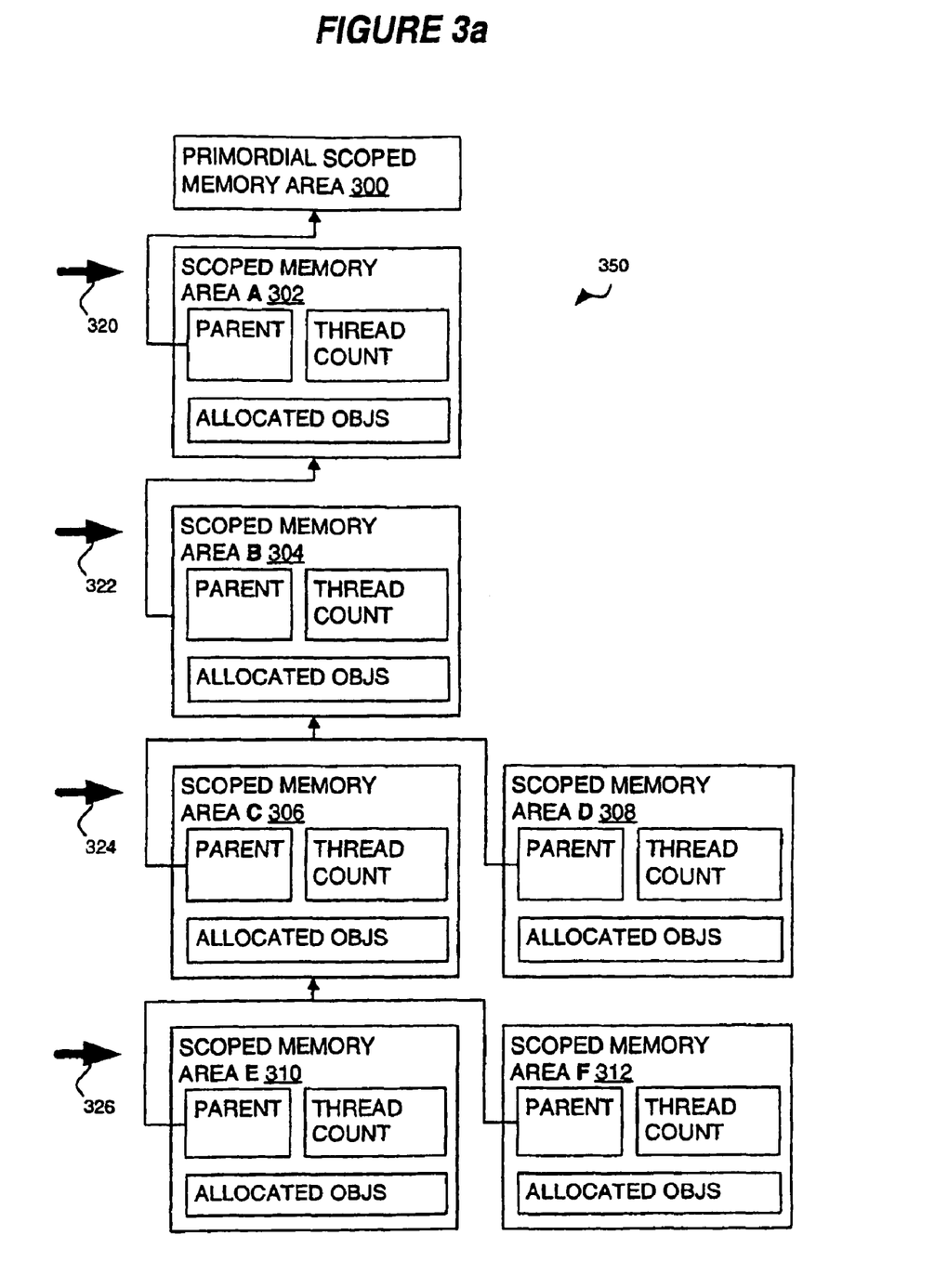
FIG. 3a is a block diagram of an exemplary scope graph of scoped memory areas in accordance with a preferred embodiment of the present invention.

FIG. 3a is a block diagram of an exemplary scope graph 350 of scoped memory areas 300 to 312 in accordance with a preferred embodiment of the present invention. The scope graph 350 illustrates a possible arrangement of scoped memory areas arising from the behaviour of software threads executing with a scoped memory system. Scoped memory area A 302 is entered by a software thread initially and has as its parent a primordial scoped memory area 300. Subsequently, scoped memory area B 304 is entered by the software thread and has as its parent scoped memory area A 302. Subsequently, scoped memory area C 306 is entered by the software thread and has as its parent scoped memory area B 304. A second scoped memory area D 308 is also entered by a software thread which also has as its parent the scoped memory area B 304. This branching in the scope graph 350 can arise, for example, due to multiple threads executing within the scoped memory system. Further, scoped memory areas E 310 and F 312 are entered by one or more threads, both having as their parent scoped memory area C 306.

Thus FIG. 3a illustrates by way of example only a possible arrangement of scope graph 350 arising due to the behaviour of software threads in entering scoped memory areas during execution. Notably, each scoped memory area can be viewed as being aligned at a particular distance through the scope graph 350 from the primordial scoped memory area 300. For example, scoped memory area A 302 is at a level 320 which is in closest proximity to the primordial scoped memory area. Scoped memory area B 304 is at a level 322. Scoped memory areas C 306 and D 308 are both at a level 324, and scoped memory areas E 310 and F 312 are both at a level 326. These levels 320 to 326 can be considered to be "depths" within the scope graph 350 and represent a distance of a scoped memory are from the primordial scoped memory area 300. Level 320 (and scoped memory area A 302) is the least deep level within the scope graph because it is in closest proximity to the primordial scoped memory area 300, whilst level 326 (and scoped memory areas E 310 and F 312) is the deepest level.

The criterion for the operation of a scoped memory system described above that a source object allocated in a source scoped memory area can only reference target objects in the same or ancestral scoped memory areas can be described in terms of the depth of a scoped memory area within the scope graph 350. In these terms, the criterion is that a source object can only reference a target object where the depth of the source scoped memory area containing the source object is the same as or deeper than the depth of the target scoped memory area containing the target object.

Figure 3B:
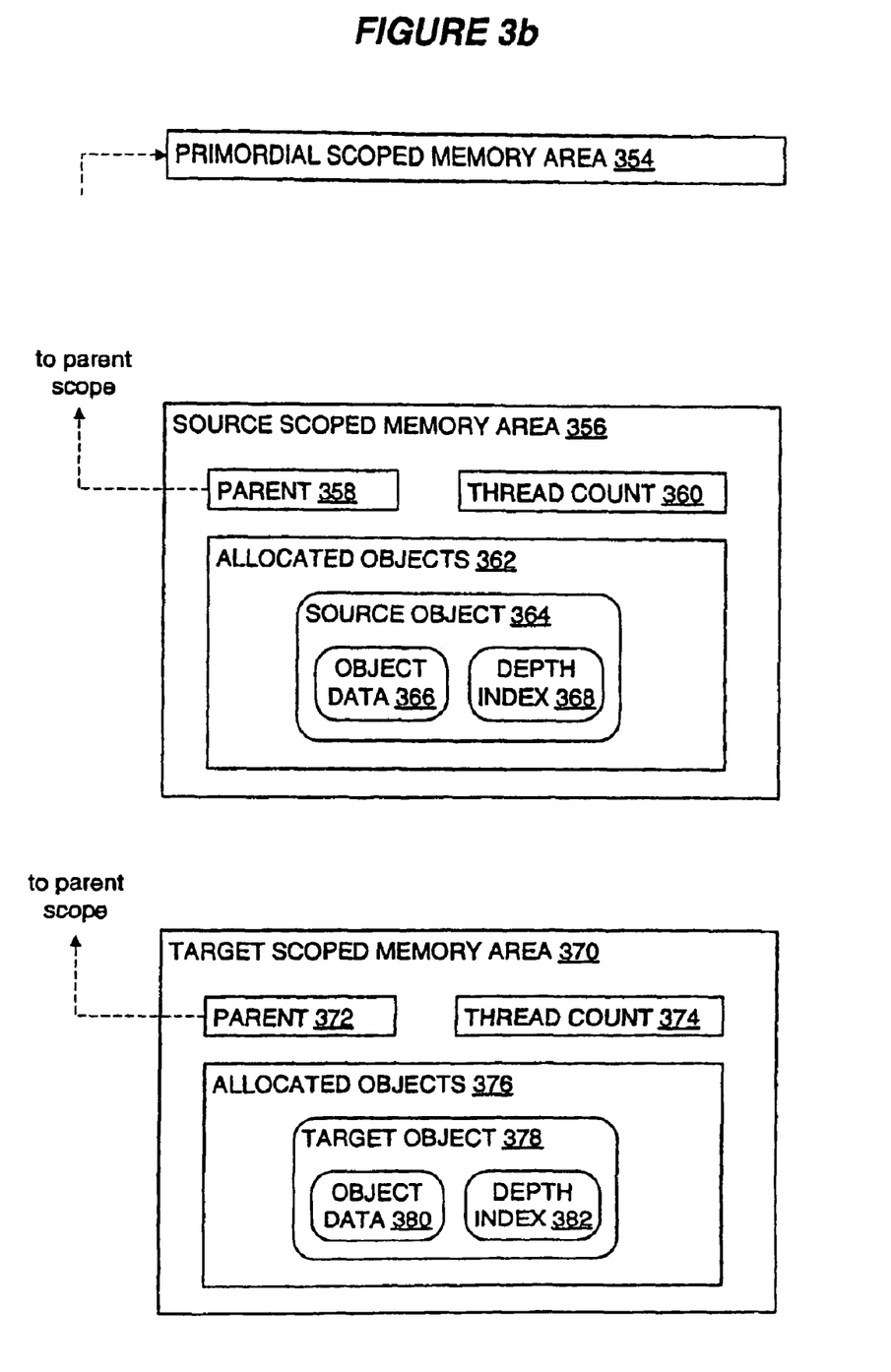
FIG. 3b is a block diagram of exemplary source and target scoped memory areas in accordance with a preferred embodiment of the present invention.

FIG. 3b is a block diagram of exemplary source 356 and target 370 scoped memory areas in accordance with a preferred embodiment of the present invention. The source scoped memory area 356 includes a source object 364 having object data 366 and a depth index 368. The object data 366 is data stored within an instantiated object in an object oriented system and can include variables and software methods. The depth index 368 is an index of the depth of the source scoped memory area 356 in a scope graph. FIG. 3b further illustrates a target scoped memory area 370 in the same scope graph as the source scoped memory area 356. The target scoped memory area 370 includes a target object 378 having object data 388 and a depth index 382.

The depth indices 368 and 382 can be determined at the time of allocation of the objects 364 and 378 respectively. This early determination is possible because the depths of a scoped memory areas cannot change during the life of an object allocated within that area due to the single parent rule of scoped memory systems which requires that the a scoped memory area retains the same position within a scope graph until it is discardable. For example, the depth of the source scoped memory area 356 cannot change during the life of the source object 364. Thus, in this way, a determination of the depth of the source and target scoped memory areas 356 and 370 can be made as part of the object allocation process for objects 364 and 376. It is therefore not necessary to undertake such arduous determination at a later stage, such as at the point of reference creation.

Figure 4A:
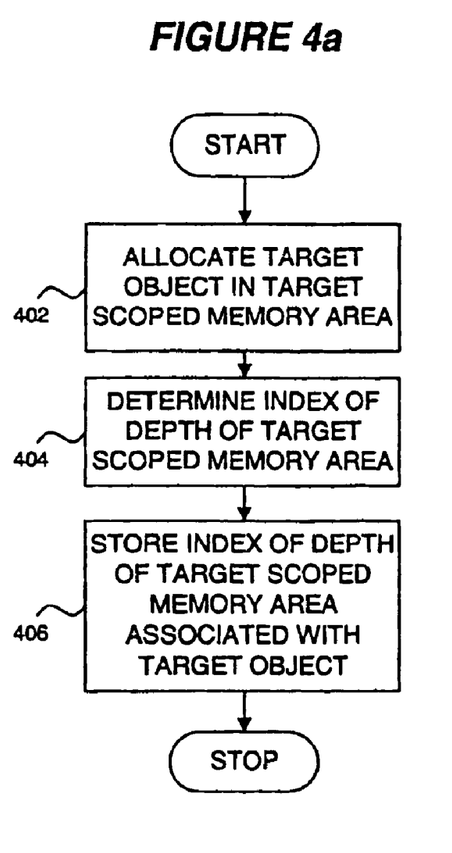
FIG. 4a is a flowchart of a method for allocating the target object of FIG. 3b in accordance with a preferred embodiment of the present invention.

FIG. 4a is a flowchart of a method for allocating the target object 378 of FIG. 3b in accordance with a preferred embodiment of the present invention. Initially, at step 402, the target object 378 is allocated in the target scoped memory area 370. Subsequently, at step 404, a determination is made as to the depth of the target scoped memory area 370. One way this determination can be made is by parsing the scope graph starting with the target scoped memory area 370 traversing to parent scoped memory areas until the primordial scoped memory area 354 is reached. At each scoped memory area an index of the depth 382 of the target scoped memory area 370 can be incremented. Thus, in this way larger values of depth index 382 can correspond to deeper scoped memory areas. Alternative arrangements of representing the depth of a scoped memory area could be used, such as by having lower values of the depth index 382 representing deeper scoped memory areas. Subsequently, at step 406, the depth of the target scoped memory area 370 is stored as depth index 382 associated with the target object 378. The depth index 382 could be stored within the target object 378, or alternatively outside the target object 378 but associated with the target object 378.

Figure 4B:
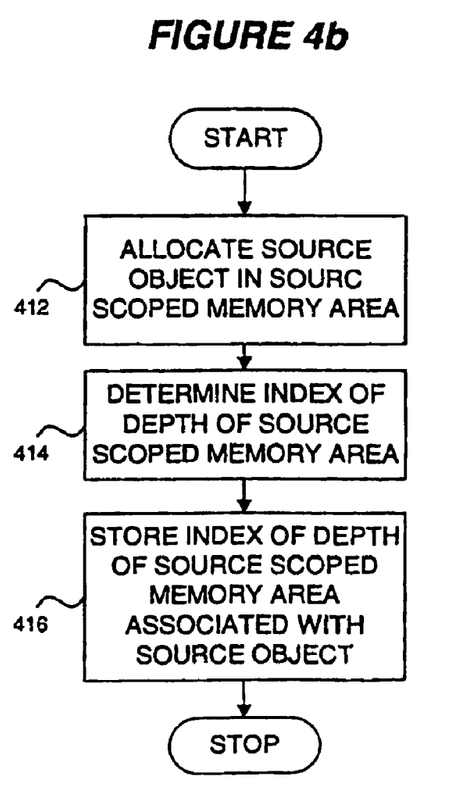
FIG. 4b is a flowchart of a method for allocating the source object of FIG. 3b in accordance with a preferred embodiment of the present invention.

FIG. 4b is a flowchart of a method for allocating the source object 364 of FIG. 3b in accordance with a preferred embodiment of the present invention. The steps of FIG. 4b for the source object 364 correspond largely to those described above with respect to FIG. 4a for the target object 378.

Figure 5:
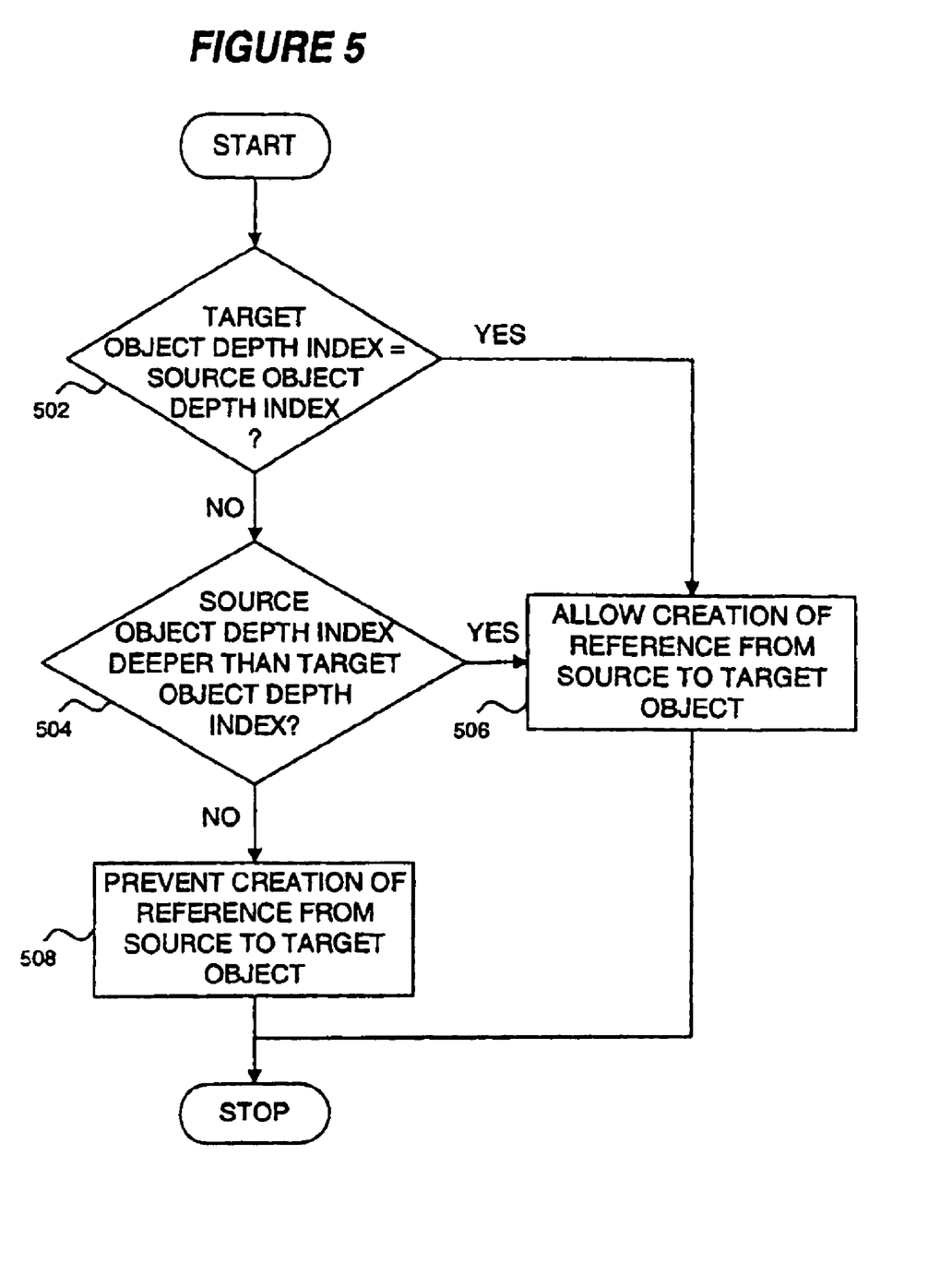
FIG. 5 is a flowchart of a method for creating a reference from the source object to the target object of FIG. 3b in accordance with a preferred embodiment of the present invention.

FIG. 5 is a flowchart of a method for creating a reference from the source object 364 to the target object 378 of FIG. 3b in accordance with a preferred embodiment of the present invention. This corresponds to the storing of a reference to the target object 378 in the source object 364 as is well known in the art. Initially, at step 502, the method determines if the depth index 382 of the target object 378 is the same as the depth index 368 of the of the source object 364. If the depths are the same the method proceeds to step 506, otherwise the method checks if the depth indices 368 and 382 indicate that the source scoped memory area 356 is deeper than the target scoped memory area 370. If the source scoped memory area is deeper than the target scoped memory area the method proceeds to step 506. At step 506 the method allows the creation of a reference from the source object 364 to the target object 378. Alternatively, if step 504 determines that the source scoped memory area is not deeper than the target scoped memory area the method proceeds to step 508 which prevents the creation of the reference.

Step 506 can alternatively include additional steps such as steps to determine that the target scoped memory area 370 is an ancestor of (in the parentage of) the source scoped memory area 356 before allowing the creation of the reference. This ancestral relationship between the source and target scoped memory areas can be determined where the source and target scoped memory areas lie in a common branch of the scope graph (where the scope graph is branched). For example, referring to FIG. 3a, scoped memory areas F 312 and C 306 lie in a common branch of the scope graph 350 because there is an ancestral relationship between them (scoped memory area C 306 is the parent of scoped memory area F 312). However, scoped memory area F 312 and scoped memory area D 308 do not lie in a common branch because scoped memory area D 308 is not an ancestor of scoped memory area F 312 and vice versa.

By way of the storage of an index of the depth of a scoped memory area associated with an object allocated in the scoped memory area at the time of creation of the object, it is not necessary to undertake to determine the depth of the scoped memory area at the time of creation of a reference. In this way the arduous iterations of the prior art in checking for satisfaction of the criteria for scoped memory systems when creating a reference between scoped memory areas are avoided.

Insofar as embodiments of the invention described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc, and the processing device utilises the program or a part thereof to configure it for operation. The computer program may be supplied from a remote source embodied in a communications medium such as an electronic signal, radio frequency carrier wave or optical carrier wave. Such carrier media are also envisaged as aspects of the present invention.

It will be understood by those skilled in the art that, although the present invention has been described in relation to the proceeding example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

For the avoidance of doubt, the term "comprising", as used herein throughout the description and claims is not to be construed as meaning "consisting only of".

The invention claimed is:

1. A method for creating a reference in a scoped memory system, the scoped memory system including a scope graph of scoped memory areas, wherein each scoped memory area is suitable for the allocation of objects therein for access by software threads and has associated a thread count for indicating that the scoped memory area is discardable, the method comprising the steps of:
    allocating a target object in a target scoped memory area;
    storing an index associated with the target object of a depth of the target scoped memory area in the scope graph, wherein the depth of the target scoped memory area in the scope graph is a distance between the target scoped memory area and a root of the scope graph, wherein the index associated with the target object is stored in the target scoped memory area during allocation of the target object;
    allocating a source object in a source scoped memory area;
    storing an index associated with the source object of a depth of the source scoped memory area in the scope graph, wherein the depth of the source scoped memory area in the scope graph is a distance between the source scoped memory area and the root of the scope graph, wherein the index associated with the source object is stored in the source scoped memory area during allocation of the source object; and
    in response to a determination that the source scoped memory area is at the same depth as or deeper than the target scoped memory area by comparing the index associated with the source object and the index associated with the target object, creating a reference from the target object to the source object, wherein the step of creating a reference from the target object to the source object is further responsive to a determination that the target scoped memory area and the source scoped memory area lie in a common branch of the scope graph.

2. The method of claim 1, wherein each scoped memory area comprises a parent field which includes a reference to a parent scoped memory area, and wherein both the target scoped memory area and the source scoped memory area include object data and a depth index, wherein the depth index for the target scoped memory area has the index associated with the target object stored therein, and wherein the depth index for the source scoped memory area has the index associated with the source object stored therein.

3. Apparatus for creating a reference in a scoped memory system, the scoped memory system including a scope graph of scoped memory areas, wherein each scoped memory area is suitable for the allocation of objects therein for access by software threads and has associated a thread count for indicating that the scoped memory area is discardable, the apparatus comprising a data processor coupled to a memory and operable to execute instructions in the memory to perform steps of:
    allocating a target object in a target scoped memory area;
    storing an index associated with the target object of a depth of the target scoped memory area in the scope graph, wherein the depth of the target scoped memory area in the scope graph is a distance between the target scoped memory area and a root of the scope graph, wherein the index associated with the target object is stored in the target scoped memory area during allocation of the target object;
    allocating a source object in a source scoped memory area;
    storing an index associated with the source object of a depth of the source scoped memory area in the scope graph, wherein the depth of the source scoped memory area in the scope graph is a distance between the source scoped memory area and the root of the scope graph, wherein the index associated with the source object is stored in the source scoped memory area during allocation of the source object; and
    in response to a determination that the source scoped memory area is at the same depth as or deeper than the target scoped memory area by comparing the index associated with the source object and the index associated with the target object, creating a reference from the target object to the source object, wherein the creating a reference from the target object to the source object is further responsive to determining that the target scoped memory area and the source scoped memory area lie in a common branch of the scope graph.

4. The apparatus of claim 3, wherein each scoped memory area comprises a parent field which includes a reference to a parent scoped memory area, and wherein both the target scoped memory area and the source scoped memory area include object data and a depth index, wherein the depth index for the target scoped memory area has the index associated with the target object stored therein, and wherein the depth index for the source scoped memory area has the index associated with the source object stored therein.

5. A computer program element comprising computer program code stored on a tangible storage device to create a reference in a scoped memory system, the scoped memory system including a scope graph of scoped memory areas, wherein each scoped memory area is suitable for the allocation of objects therein for access by software threads and has associated a thread count for indicating that the scoped memory area is discardable, when the computer program code is loaded into a computer system and executed thereon, by causing the computer to perform the steps of:

allocating a target object in a target scoped memory area;

storing an index associated with the target object of a depth of the target scoped memory area in the scope graph, wherein the depth of the target scoped memory area in the scope graph is a distance between the target scoped memory area and a root of the scope graph, wherein the index associated with the target object is stored in the target scoped memory area during allocation of the target object;

allocating a source object in a source scoped memory area;

storing an index associated with the source object of a depth of the source scoped memory area in the scope graph, wherein the depth of the source scoped memory area in the scope graph is a distance between the source scoped memory area and the root of the scope graph, wherein the index associated with the source object is stored in the source scoped memory area during allocation of the source object; and in response to a determination that the source scoped memory area is at the same depth as or deeper than the target scoped memory area by comparing the index associated with the source object and the index associated with the target object, creating a reference from the target object to the source object, wherein the creating a reference from the target object to the source object is further responsive to a determination that the target scoped memory area and the source scoped memory area lie in a common branch of the scope graph.

6. The computer program element of claim 5, wherein each scoped memory area comprises a parent field which includes a reference to a parent scoped memory area, and wherein both the target scoped memory area and the source scoped memory area include object data and a depth index, wherein the depth index for the target scoped memory area has the index associated with the target object stored therein, and wherein the depth index for the source scoped memory area has the index associated with the source object stored therein.

* * * * *